Sept. 18, 1956　　　H. STANGE　　　2,763,698
PRODUCTION OF DDT
Filed May 28, 1953
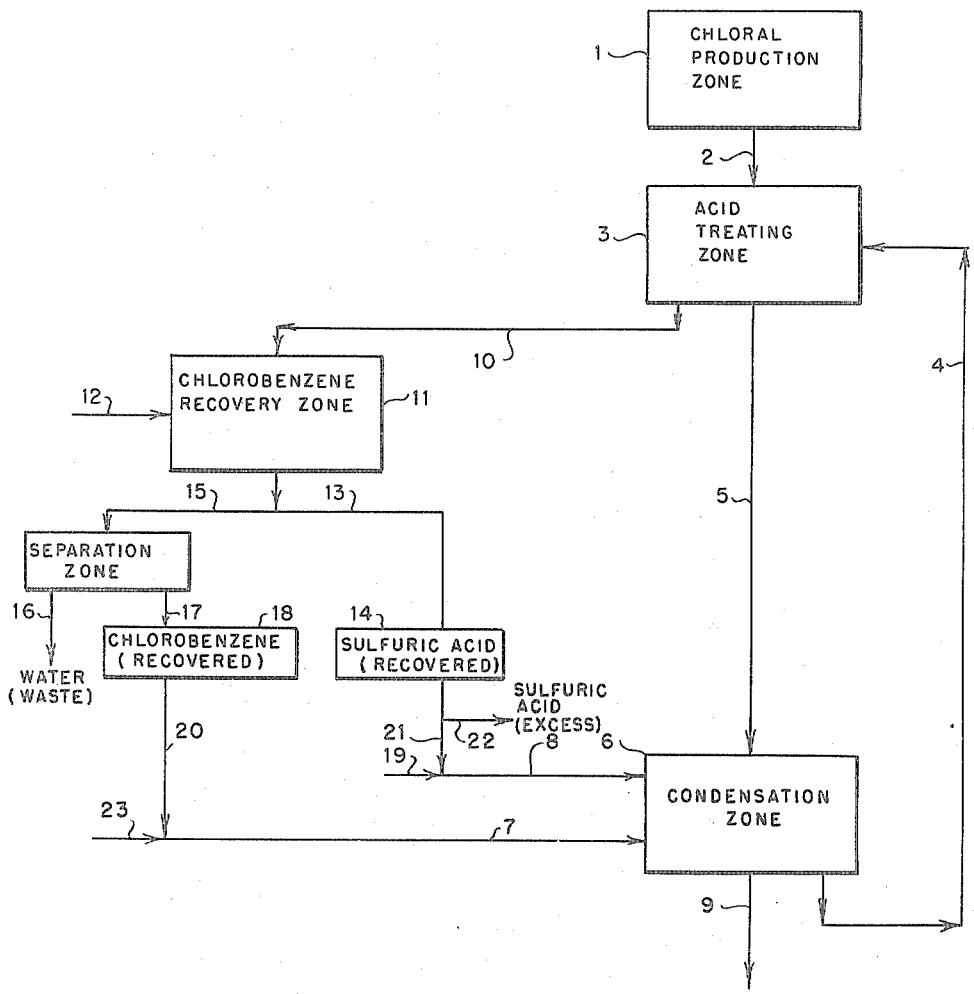
Hugo Stange
INVENTOR.
BY
Adams, Forward and McLean
ATTORNEYS

United States Patent Office 2,763,698
Patented Sept. 18, 1956

2,763,698

PRODUCTION OF DDT

Hugo Stange, Niagara Falls, N. Y., assignor to Olin Mathieson Chemical Corporation, a corporation of Virginia Application May 28, 1953, Serial No. 358,014

3 Claims. (Cl. 260—649)

My invention relates to the manufacture of DDT (2,2-bis-(p-chlorophenyl)-1,1,1-trichloroethane) by the condensation of chloral with chlorobenzene and in particular to a process characterized by the conservation of sulfuric acid and the recovery of chlorobenzene.

Chloral may be manufactured by the chlorination of acetaldehyde or its polymer paraldehyde. The chlorination may be carried out in various manners under aqueous or anhydrous conditions. Preferably, the chlorination is carried out under aqueous conditions in a multi-stage continuous process with rising temperatures in each stage. A particularly advantageous method is two stage continuous chlorination followed by a batch chlorination of the continuous intermediate product. The crude chloral so obtained is then usually purified to remove under chlorinated products. To produce DDT the purified chloral is then condensed with an excess of chlorobenzene in the presence of sulfuric acid. Excess chlorobenzene, necessary to obtain a good yield of DDT, is sulfonated by the strong sulfuric acid to form chlorobenzenesulfonic acid which remains in the residual sulfuric acid layer and results in not only a loss of chlorobenzene but also of sulfuric acid.

I have devised a continuous process for the production of DDT by the condensation of chloral with chlorobenzene in the presence of sulfuric acid in which sulfuric acid is effectively conserved and chlorobenzene is efficiently recovered for reuse from chlorobenzenesulfonic acid formed during the condensation. I have found that good yields of DDT with a high setting point that is equal to that obtained with chloral freshly prepared from crystalline chloral hydrate can be produced directly from crude chloral obtained by the chlorination of acetaldehyde or paraldehyde by condensation with chlorobenzene in the presence of sulfuric acid. Since water is present in the crude chloral, a large additional amount of oleum is required for the condensation to maintain the desired concentration of sulfuric acid. I have found that subjecting the crude chloral to a preliminary treatment with waste sulfuric acid from the condensation step advantageously removes most of the water from the crude chloral and greatly reduces the amount of oleum required for the condensation with chlorobenzene. I have also found that chlorobenzene is recovered in good yields by treating the waste sulfuric acid containing chlorobenzenesulfonic acid directly with steam at an elevated temperature.

The process of my invention then comprises treating crude chloral obtained by the chlorination of acetaldehyde or paraldehyde with waste sulfuric acid separated from the chloral-chlorobenzene condensation step to remove most of the water present in the crude chloral, condensing the acid-treated chloral with excess chlorobenzene in the presence of sulfuric acid, separating and recovering DDT, returning waste sulfuric acid to the chloral treating step, recovering the waste acid from this step and treating the waste acid with steam at elevated temperature to separate chlorobenzene from the chlorobenzenesulfonic acid present in the acid.

The process of my invention thus provides a continuous process for producing DDT from crude chloral in which sulfuric acid is effectively conserved and utilized to reduce oleum requirements and in which chlorobenzene is recovered for reuse from a reaction by-product.

The process of my invention will be further illustrated by reference to the accompanying drawing which is a simplified flow diagram of a continuous method of operation. In the drawing, crude chloral is produced in production zone 1 by the chlorination of acetaldehyde or paraldehyde under aqueous or anhydrous conditions. I have found that a particularly advantageous method is two stage continuous aqueous chlorination under rising temperature conditions followed by a batch chlorination under pressure. The first continuous stage chlorination is carried out at a temperature of about 10° to 15° C. The chlorine feed is about 3.5 to 4 moles per hour, the paraldehyde feed (as acetaldehyde) about 2 moles per hour and the ratio of water to acetaldehyde is about 2 to 1. The molar ratio of chlorine to reacted aldehyde is about 1.0 to 1.5:1. The second stage is carried out at a temperature of about 25° to 35° C. with a chlorine feed of about 2 to 2.5 moles per hour and the molar ratio of chlorine to reacted aldehyde is about 1.8 to 1. The continuous intermediate product from the second stage is then batch chlorinated at a temperature of about 50° to 90° C. and a pressure of about 50 p. s. i. g. The crude chloral is then recovered in good yields.

The crude chloral is removed from production zone 1 by line 2 to acid-treating zone 3 where it is contacted with concentrated waste sulfuric acid returned by line 4 from the condensation reaction of chloral and chlorobenzene to remove water. The treatment is preferably carried out by extraction and the extraction is preferably a countercurrent multiple extraction operation. High recoveries of chloral of high concentration containing very small amounts of water and acid are possible with this method, for example, a recovery of 94 per cent chloral containing only about 1.5 per cent water and 1.5 per cent sulfuric acid. The chloral may also be recovered by distillation of the acid-chloral mixture at atmospheric pressure. If desired, the distillate may be further purified by treatment with concentrated sulfuric acid to increase the chloral concentration. Usually the distillate is treated with enough concentrated acid to form acid with a density of at least about 1.82. The resulting chloral layer often contains, however, suspended colloidal sulfuric acid droplets which fail to separate on long standing. This suspended acid causes considerable decomposition and carbonization on distillation of this material at atmospheric pressure. Distillation at reduced pressure, however, minimizes decomposition.

The separated chloral, from which most of the water has been removed, is removed from treating zone 3 by line 5 to condensation zone 6. In the condensation zone 6 the chloral is condensed with chlorobenzene introduced by line 7 in the presence of sulfuric acid introduced by line 8. Excess chlorobenzene is used to obtain good yields of DDT and the molar ratio of chlorobenzene to chloral may range from about 2 to 4.5:1. The temperature of the condensation reaction may range from ordinary temperatures, e. g. about 40° C., down to about 0° C. but preferably ranges from about 5° to 15° C. Suitable heat exchange means are provided to dissipate the excess heat of reaction and to prevent excessive reaction temperatures. Sulfuric acid of a concentration of about 98 per cent is added to the mixture of chloral and chlorobenzene. Oleum or sulfur trioxide is added to offset the diluting effect of water present in the chloral and is added in amounts necessary to keep the final acid concentration at about 96 to 100 per cent after taking up the water of reaction. The amount of oleum or sulfur trioxide required depends on the amount of water formed in the reaction and upon the amount introduced with the chloral.

The DDT is then recovered by any of the conventional methods of recovering DDT such as hot hexane extraction or separating molten DDT from the mixture after heating above the melting point of DDT. Traces of acids are removed from the DDT extract or melt by the usual water and alkaline washes. Recovered DDT, removed by line 9 may be subjected to further treatment to improve its setting point, for example, by solvent extraction with an alcohol such as ethanol or methanol or by recrystallization.

Spent sulfuric acid containing chlorobenzenesulfonic acid formed during the condensation reaction is returned by line 4 to acid-treating zone 3 where it is utilized to remove water from the crude chloral as described above. The acid is recovered and removed by line 10 to chlorobenzene recovery zone 11. In the zone 11 steam is introduced by line 12 directly into the waste acid at a temperature of about 200° to 220° C. Steam and chlorobenzene leave the chlorobenzene recovery zone 11 by line 15 and are condensed and separated. Water is discarded by line 16 and recovered chlorobenzene is recycled to the condensation zone 6 by line 17, chlorobenzene storage 18 and lines 20 and 7. Sulfuric acid is removed by line 13 to storage 14 and by lines 21 and 8 to the condensation zone 6. Excess sulfuric acid may be recovered by line 22. Chlorobenzene is recovered in good yields, for example, when steam was passed directly through the waste acid at 200° to 220° C., 77 per cent of chlorobenzene, not accounted for as DDT, was recovered. A portion of the waste sulfuric acid from the chlorobenzene recovery zone may be strengthened with oleum or sulfur trioxide to a concentration of about 98 per cent for the condensation reaction. Waste acid in excess of that required for condensation would be removed from the process. Fresh chlorobenzene is introduced to the process via lines 23 and 7. Fresh sulfuric acid, oleum or sulfur trioxide may be introduced to the condensation zone by lines 19 and 8.

Alternatively, it may be advantageous to send only a portion, for example, the excess sulfuric acid from the acid treating zone 3 to the chlorobenzene recovery zone 11. The remaining portion of the sulfuric acid from the acid treating zone 3 may be fortified with the required amount of oleum or sulfur trioxide to effect the condensation reaction and cycled directly to condensation zone 6.

My invention will be further illustrated by the following example.

Crude chloral obtained by two-stage continuous aqueous chlorination of acetaldehyde followed by batch chlorination under pressure was condensed with chlorobenzene in the presence of sulfuric acid. The crude chloral contained 66 per cent chloral and 19 per cent water. The condensation was carried out in a one liter flask equipped with three standard taper joints which were fitted with a dropping burette, thermowell and a Hirschberg stirrer. The flask was provided with external cooling. Oleum was added to the cooled mixture of chloral and chlorobenzene to react with the water in the crude chloral and to take up the water of reaction, resulting in a final acid concentration of 98 to 100 per cent. Purified chloral (98 per cent) was also used for comparison.

The results are tabulated below:

| | | | | | |
|---|---|---|---|---|---|
| Chloral, Percent | 98 | 66 | 66 | 66 | 66 |
| Molar Ratio: | | | | | |
| Chloral to chlorobenzene | 4.5 | 4.5 | 4.5 | 2.8 | 2.8 |
| Sulfuric Acid and Oleum, gms | 2,200 | 2,200 | 2,200 | 534 | 534 |
| Oleum Addition: | | | | | |
| Time, hrs | 4 | 4 | 4 | 7 | 7 |
| Temp., °C | 5–10 | 5–10 | 15 | 15 | 15 |
| Further Agitation: | | | | | |
| Time, Hrs | 4 | 4 | 3½ | ½ | ¾ |
| Temp., °C | 5–10 | 5–10 | 15–25 | 15 | 15 |
| DDT Yield, Percent | 97 | 96 | 96 | 85 | 89 |
| DDT Setting Point, °C | 88.5 | 88 | 87 | 88.5 | 86 |

As shown above, DDT of an equally high setting point was obtained from crude chloral containing only 66 per cent chloral and with purified (98 per cent) chloral and was obtained in comparable yields. By subjecting the crude chloral to a preliminary treatment with waste sulfuric acid from the condensation step to remove most of the water from the chloral, the oleum requirements for the condensation step will be greatly reduced and DDT of a high setting point will be obtained in good yields.

I claim:

1. In the production of DDT by chlorinating acetaldehyde to produce crude chloral containing water, dehydrating said crude chloral, and condensing the dehydrated chloral with an excess of chlorobenzene in the presence of sulfuric acid at a temperature of 0° to 40° C. to produce DDT, the improvement which comprises separating and recovering waste sulfuric acid containing chlorobenzene sulfonic acid from said DDT product, returning said recovered acids to the dehydrating step wherein said crude chloral is contacted with said waste sulfuric acid and chlorobenzenesulfonic acid to remove water from said crude chloral, separating said acids with absorbed water from the dehydrating step, treating the separated acids from said dehydrating step with steam at elevated temperatures to recover chlorobenzene and sulfuric acid, and returning said chlorobenzene and sulfuric acid to the condensing step.

2. The process of claim 1 in which the aldehyde is in its polymeric paraldehyde form.

3. The process of claim 1 in which the waste sulfuric acid and crude chloral are contacted under extraction conditions.

References Cited in the file of this patent
UNITED STATES PATENTS 2,511,167    Manske et al. _____ June 13, 1950

FOREIGN PATENTS 661,092    Great Britain _____ Nov. 14, 1951